United States Patent
Bertin et al.

[11] 3,724,588
[45] Apr. 3, 1973

[54] CUSHION CONFINING SYSTEM

[75] Inventors: Jean Henri Bertin, Neuilly-sur-Seine; Paul Francois Guiènne, Paris, both of France

[73] Assignee: Bertin & Cie, Plaisir, France

[22] Filed: Jan. 25, 1971

[21] Appl. No.: 109,200

Related U.S. Application Data

[62] Division of Ser. No. 775,697, Nov. 14, 1968, Pat. No. 3,587,773.

[30] Foreign Application Priority Data

Nov. 17, 1967 France..............................67128758

[52] U.S. Cl....................180/118, 180/124, 180/127
[51] Int. Cl..............................................B60v 1/16
[58] Field of Search.............180/124, 121, 127, 118

[56] References Cited

UNITED STATES PATENTS

| 3,245,487 | 4/1966 | Mackie | 180/124 |
| 3,301,343 | 1/1967 | Hardy et al. | 180/124 X |
| 3,332,508 | 7/1967 | Bertin et al. | 180/124 X |
| 3,444,952 | 5/1969 | Clarke | 180/127 |
| 3,513,934 | 5/1970 | Crowley | 180/124 |

Primary Examiner—Kenneth H. Betts
Attorney—Stevens, Davis, Miller & Mosher

[57] ABSTRACT

An air-cushion vehicle is provided with a deformable enclosure within the cushion. The enclosure is connected to two sources delivering different fluid pressures through control valves which allow the pressure in the enclosure to be adjusted to any value intermediate those of the above two sources.

8 Claims, 2 Drawing Figures

PATENTED APR 3 1973 3,724,588
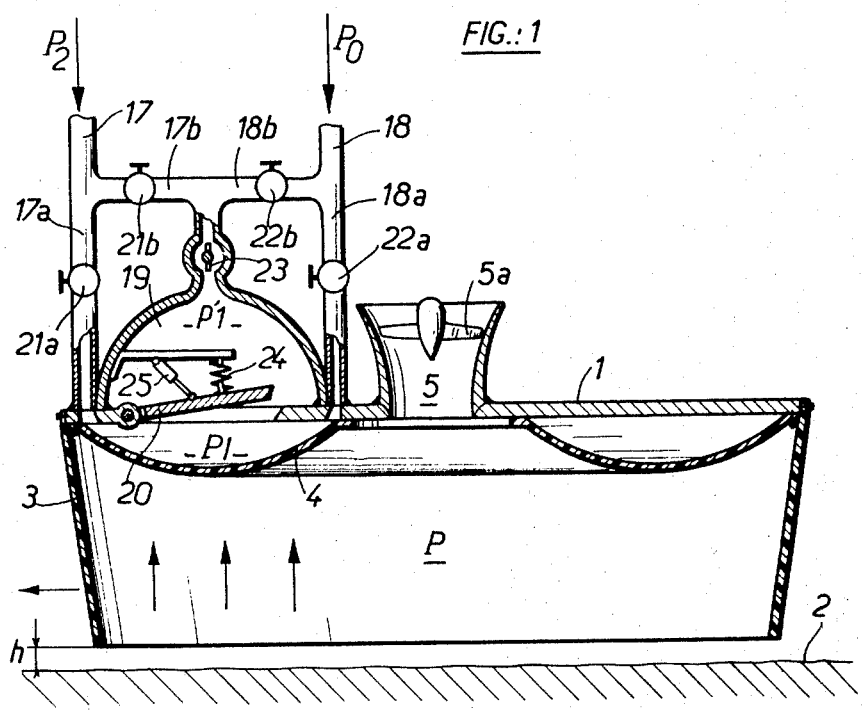
FIG.: 1
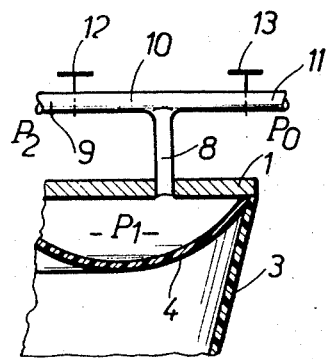
FIG.: 2

CUSHION CONFINING SYSTEM

This is a divisional application of our copending application Ser. No. 775,697 filed on Nov. 14, 1968 and since issued as U.S. Pat. No. 3,587,773.

Cushions of air or other pressure fluid for bearing or guiding a load or a land or water craft by ground-effect operate, of course, by the pressure of air or some other fluid maintained between the ground and the load, the volume in which the pressure is operative being bounded laterally by a usually flexible or deformable skirt or by a fluid curtain. Of course the word "ground" denote terrestrial land in general, the surface of a prepared track on which the load or vehicle is required to move, and a flat stretch of water.

The pressure-fluid source must maintain the cushion at a pressure which balances load or vehicle weight, despite a permanent leakage. If the leakage diminishes as a result of unevennesses in the ground or of load or vehicle movements, cushion pressure increases and the load rises. Conversely, if leakage increases pressure drops and the load descends. The system is therefore stable. However, cushion pressure may become excessive and produce bearing forces, and therefore accelerations, which are unsatisfactory for the equipment and for the passengers on board. More particularly, when leakage varies very rapidly, pressure peaks may be produced with a value in excess of the maximum pressure which the pressure-fluid source can provide. The phenomenon is comparable to water-hammer.

An object of this invention is to reduce these pressure peaks.

To this effect, the solid wall forming at least part of the air cushion boundary has a deformable portion returned resiliently by a force opposing the force exerted on such portion by the cushion pressure, the deformable portion having a large enough surface and amplitude of movement for the increase in volume of the air cushion arising from deformation of the deformable portion to be able to absorb brief pressure peaks.

Advantageously, the return force of the deformable portion varies little with the deformation; this can be achieved by producing this return force by a substantially constant fluid pressure slightly above normal cushion pressure.

Preferably, the deformable portion is a bead of rubber or some other flexible resilient substance disposed inside the fluid cushion and inflated like a pneumatic type to a pressure slightly above the normal cushion pressure, the deformable enclosure bounded by this portion comprising a member via which, if the pressure in the cushion becomes excessive, fluid can escape from such enclosure.

The following description, taken together with the accompanying drawings, will show clearly how the invention can be carried into effect.

FIG. 1 is a view in elevation and vertical section of a preferred embodiment according to the invention.

FIG. 2 is a fragmentary view of an alternative embodiment.

Referring to the drawings, consideration has been given to the case in which the fluid cushion is of the "plenum chamber" kind - i.e., is bounded laterally by a solid and usually flexible wall or skirt, although the invention also covers the case in which the cushion is confined by a pressure-fluid curtain produced by a slit-like nozzle.

In the illustrated embodiment, there can be seen a platform 1 of a ground-effect vehicle or load support borne by one or more cushions of air or other pressure fluid, only one of the cushions being shown. As a rule, a cushion of this kind is confined at the top by the platform 1, at the bottom by surface 2 along which the machine moves, and laterally by a flexible skirt 3 (or alternatively by a fluid curtain).

A pressure-fluid source supplies the cushion through a nozzle 5. In the example shown, the pressure-fluid source is assumed to be a fan whose rotor 5a is shown diagrammatically. The pressure in the cushion exerts on platform 1 a lifting force tending to raise the vehicle, with a simultaneous increase in the leakage flow through the daylight clearance or gap between the surface 2 and the free edge of skirt 3. Equilibrium is reached at a cushion pressure $p$ corresponding to a particular leakage gap $h$. If, due to unevennesses of the surface 2 or irregular vehicle movements, the gap $h$ diminishes briefly, cushion pressure increases, the vehicle rising until the original gap $h$ has been restored. Conversely, when the gap $h$ increases, pressure drops and the vehicle descends until the proper gap and pressure are restored. The system is therefore stable.

However, a very rapid reduction of the leakage gap may produce brief very high pressure peaks which may possibly exceed the discharge pressure of the fan 5a.

To cut down these pressure peaks, the fluid cushion volume is bounded by a deformable hermetic portion 4, e.g. of rubber, which forms in the cushion space a kind of annular bead extending around the feed nozzle 5. The bead interior, which forms an enclosure separate from the cushion space, is kept inflated to a pressure $p_1$ slightly higher than the normal cushion pressure $p$.

In the embodiment shown in FIG. 1, two pressure fluid sources supply both the enclosure bounded by the deformable envelope 4 through ducts 17, 17a, and 18, 18a respectively and also, through ducts 17, 17b and 18, 18b respectively, a chamber 19 disposed on platform 1 opposite a relief valve 20 adapted to connect the enclosure bounded by envelope 4 to chamber 19. An HP source delivers a pressure $p_2$ greater than the pressure $p_1$ normally required on envelope 4, and a LP source delivers a pressure $p_0$ which is less than $p_1$ and which can be atmospheric pressure. The various ducts have valves 21a, 21b, 22a, 22b, 23 for adjusting the pressures $p_1$, $p'_1$ (the latter obtaining in the chamber 19) to values between $p_2$ and $p_0$.

The top surface of valve 20 is biased by a spring 24 associated with a damper 25, and by the pressure $p'_1$ in the chamber 19, so that a return force greater than the force applied to the valve bottom surface by the pressure $p_1$ is produced. The valve 20 opens in the event of an abrupt increase in the pressure $p_1$ so that the envelope 4 can deform in order to take up the pressure peak.

Thus if the cushion pressure rises abruptly, the flexible envelope 4 tends to flatten out until it reaches a new equilibrium position, with a consequent increase in the volume presented to the fluid in the cushion and a correlative decrease of the pressure peak. The greater the volume variation of which the bead formed by the envelope 4 is capable, the more conspicuous is the above effect. Conveniently, therefore, the envelope 4 has a large surface and is so designed as to bound a large volume in its equilibrium position corresponding to normal cushion pressure.

The required result could be achieved by permanently inflating the envelope 4 to the pressure $p_1$ slightly higher than the pressure $p$ and by hermetically closing the enclosure bounded by the envelope 4, as is done in the case of a motor vehicle tire.

In the alternative embodiment shown in FIG. 2, the envelope 4 is inflated by the HP source delivering a pressure $p_2$ higher than the pressure $p_1$ normally needed on the envelope 4. The pressure fluid source delivers its pressure at a place 9 to a duct 10 connected to a duct 8 opening into the enclosure bounded by the envelope 4 and at a place 11 to atmosphere or any other LP source at a pressure $p_0$ less than $p_1$. $p_1$ can be adjusted to any value between $p_2$ and $p_0$ by means of cocks 12, 13 disposed in duct 10 on either side of duct 8.

What we claim is:

1. A surface effect machine movable along a bearing surface with the interposition of a pressure fluid cushion bounded at least partly by a deformable wall defining a deformable enclosure separate from said pressure fluid cushion, wherein the improvement comprises controllable means for selectively connecting said enclosure to a first zone at a relatively high pressure in excess of the normal operative cushion pressure, further controllable means for selectively connecting said enclosure to a second zone at a relatively low pressure, whereby to adjust the pressure obtaining in said enclosure to a value intermediate said relatively high pressure and said relatively low pressure, and a relief valve fitted on said enclosure and biased to closing position against said pressure obtaining in said enclosure.

2. Machine as claimed in claim 1, further comprising a pressurized chamber separate from said deformable enclosure and communicating therewith through said relief valve, the pressure in said pressurized chamber contributing to biasing said relief valve to closing position.

3. Machine as claimed in claim 2, further comprising controllable means for selectively connecting said chamber to said first high-pressure zone, and further controllable means for selectively connecting said chamber to said second low-pressure zone, whereby to adjust the pressure obtaining in said chamber to a value intermediate said relatively high pressure and said relatively low pressure.

4. Machine as claimed in claim 3, wherein said first zone comprises a high-pressure source whereas said second zone is at ambient pressure, said further controllable means comprising a vent to the atmosphere.

5. Machine as claimed in claim 3, wherein said controllable means comprise respective valves controllable independently of each other.

6. Machine as claimed in claim 3, further comprising a T-connection between said controllable means and said chamber having two arm portions leading respectively to said two controllable means and a stem portion leading to said chamber, and an additional controllable means in said stem portion.

7. Machine as claimed in claim 6, wherein said three controllable means comprise respective valves controllable independently of each other.

8. Machine as claimed in claim 1, further comprising damping means associated with said relief valve.

* * * * *